(12) United States Patent
Croak et al.

(10) Patent No.: US 7,974,292 B1
(45) Date of Patent: Jul. 5, 2011

(54) METHOD AND APPARATUS FOR DYNAMICALLY ADJUSTING BROADBAND ACCESS BANDWIDTH

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1009 days.

(21) Appl. No.: 11/323,210

(22) Filed: Dec. 31, 2005

(51) Int. Cl.
*H04L 12/28* (2006.01)
(52) U.S. Cl. .................. 370/395.2; 370/395.41
(58) Field of Classification Search ............ 370/468
See application file for complete search history.

(56) References Cited

U.S. PATENT DOCUMENTS

| 5,463,629 | A | * | 10/1995 | Ko | 370/463 |
| 5,631,846 | A | * | 5/1997 | Szurkowski | 324/605 |
| 2005/0128951 | A1 | * | 6/2005 | Chawla et al. | 370/235 |
| 2005/0195741 | A1 | * | 9/2005 | Doshi et al. | 370/230 |

* cited by examiner

*Primary Examiner* — Seema S Rao
*Assistant Examiner* — Sai-Ming Chan

(57) ABSTRACT

A method and apparatus for providing a method to enable subscribers of broadband access services, such as Digital Subscriber Loop based or Cable based broadband access services, to dynamically reconfigure their access arrangements as a function of the application they invoke are disclosed. Subscribers that subscribe to a basic amount of bandwidth can dynamically increase their bandwidth allocation when they invoke a voice or video application by simply requesting the application. The present invention provides a method for broadband service providers to dynamically adjust access bandwidth allocation for subscribers by detecting signaling messages, such as application request setup messages and disconnect messages.

20 Claims, 5 Drawing Sheets

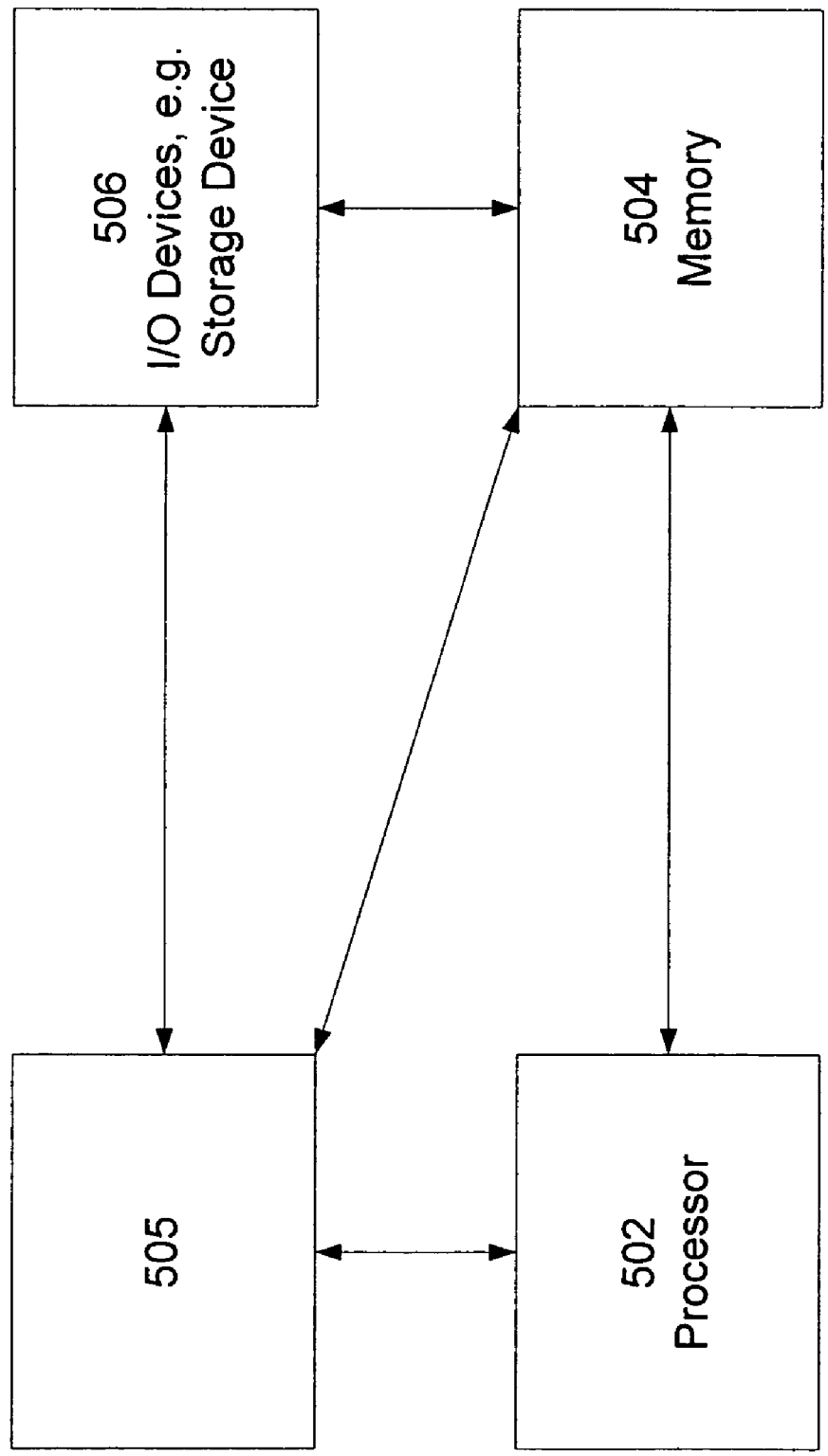

US 7,974,292 B1

METHOD AND APPARATUS FOR DYNAMICALLY ADJUSTING BROADBAND ACCESS BANDWIDTH

The present invention relates generally to communication networks and, more particularly, to a method and apparatus for dynamically adjusting broadband access bandwidth in communication networks, e.g. packet networks such as Voice over Internet Protocol (VoIP) networks.

BACKGROUND OF THE INVENTION

Subscribers of broadband access services are increasingly subscribing to VoIP services. The bandwidth needed for transmitting voice packets is typically higher than needed for basic data transmissions. This is especially true if higher voice quality is required and the voice packets receive a minimal amount of compression to preserve the quality of the voice communication.

Therefore, a need exists for a method and apparatus for dynamically adjusting broadband access bandwidth in a packet network, e.g., a VoIP network.

SUMMARY OF THE INVENTION

In one embodiment, the present invention provides a method to enable subscribers of broadband access services, such as Digital Subscriber Loop based or Cable based broadband access services, to dynamically reconfigure their access arrangements as a function of the application they invoke. Subscribers that subscribe to a basic amount of bandwidth can dynamically increase their bandwidth allocation when they invoke a voice or video application by simply requesting the application. The present invention provides a method for broadband service providers to dynamically adjust access bandwidth allocation for subscribers by detecting signaling messages, such as application request setup messages and disconnect messages.

BRIEF DESCRIPTION OF THE DRAWINGS

The teaching of the present invention can be readily understood by considering the following detailed description in conjunction with the accompanying drawings, in which:

FIG. 5 illustrates a high level block diagram of a general purpose computer suitable for use in performing the functions described herein.

To facilitate understanding, identical reference numerals have been used, where possible, to designate identical elements that are common to the figures.

DETAILED DESCRIPTION

Figure 1:
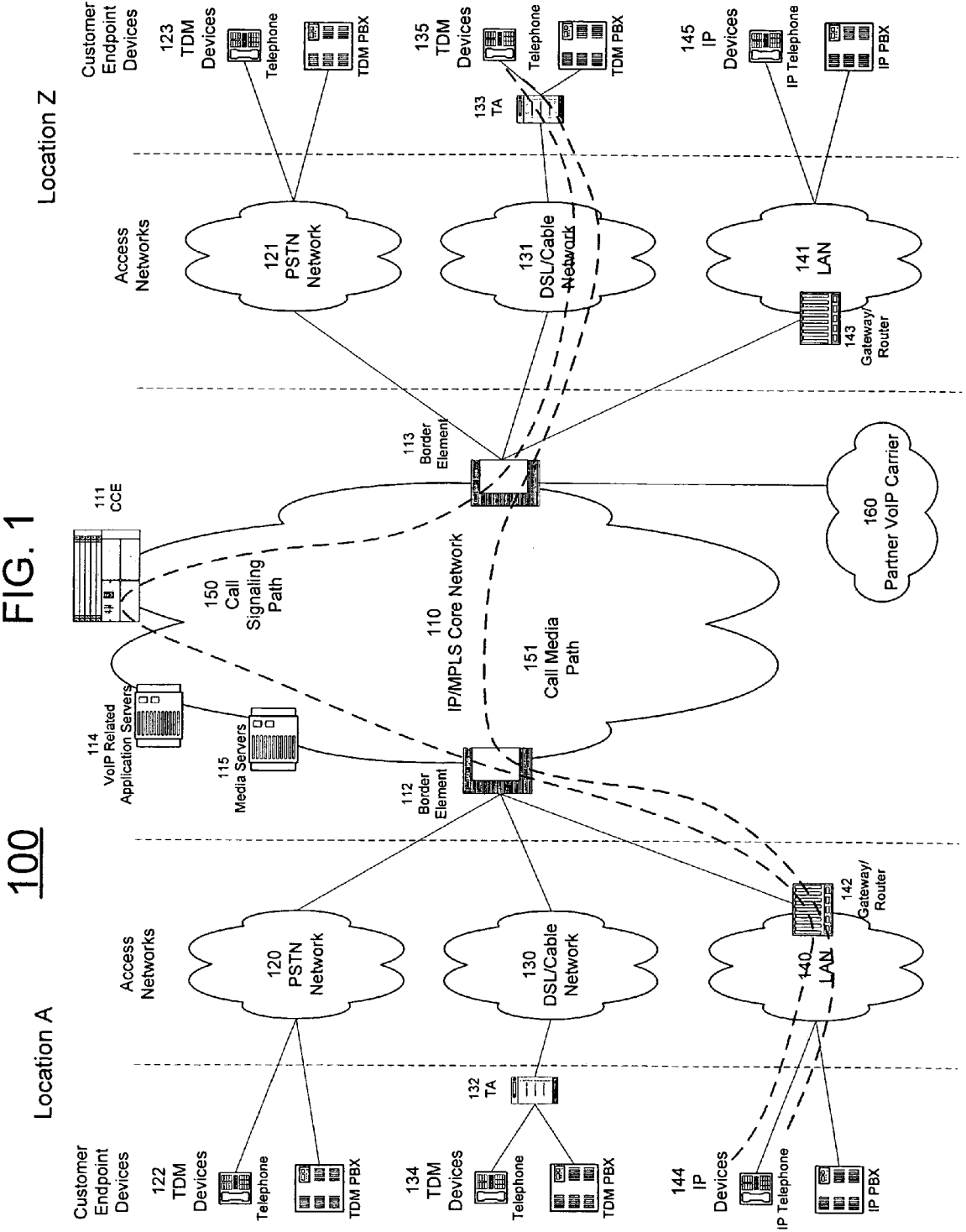
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Subscribers of broadband access services are increasingly subscribing to VoIP services. The bandwidth needed for transmitting voice packets is typically higher than needed for basic data transmissions. This is especially true if higher voice quality is required and the voice packets receive a minimal amount of compression to preserve the quality of the voice communication.

To address this need, the present invention provides a method to enable subscribers of broadband access services, such as Digital Subscriber Loop based or Cable based broadband access services, to dynamically reconfigure their access arrangements as a function of the application they invoke. Subscribers that subscribe to a basic amount of bandwidth can dynamically increase their bandwidth allocation when they invoke a voice or video application by simply requesting the application. The present invention provides a method for broadband service providers to dynamically adjust access bandwidth allocation for subscribers by detecting signaling messages, such as application request setup messages and disconnect messages.

Figure 2:
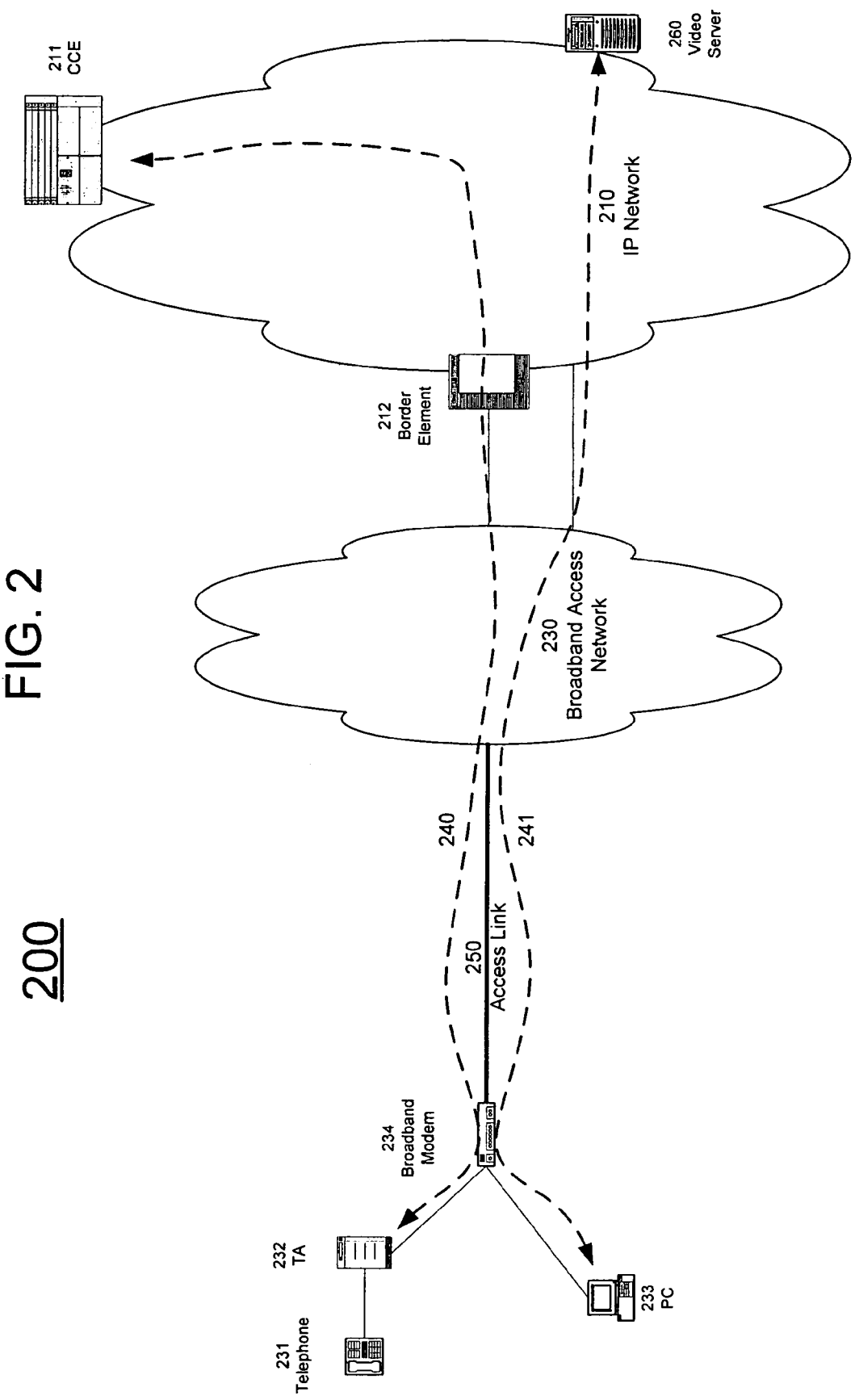
FIG. 2 illustrates an example of dynamically adjusting broadband access bandwidth in a VoIP network of the present invention.

FIG. 2 illustrates an example 200 of dynamically adjusting broadband access bandwidth in a packet network, e.g., a VoIP network of the present invention. In FIG. 2, a subscriber uses telephone 231 and TA 232 via broadband modem 234 to access VoIP phone services and PC 233 via broadband modem 234 to access IP network services. Broadband modem 234 is connected to Broadband Access Network 230 using access link 250. Broadband Access Network 230 is connected to the edge VoIP network element, BE 212, as well as directly to IP Network 210.

When the subscriber makes a phone call using telephone 231, TA 232 sends a call setup signaling message to CCE 211 using flow 240. The call setup message traverses Broadband Modem 234, Access Link 250, Broadband Access Network 230, BE 212, IP Network 210, and CCE 211 in the order specified. When Broadband Access Network 230 detects the call setup signaling message to establish a VoIP call by the subscriber, Broadband Access Network 230 checks if the subscribed bandwidth subscribed by the subscriber is sufficient to support the VoIP call. Broadband Access Network 230 uses a list of required bandwidth and associated network application types to determine if the available bandwidth to the subscriber needs to be adjusted to support the requested application being setup via signaling. Broadband Access Network 230 regularly updates the list of required bandwidth and associated network application types to handle new application types.

Broadband Access Network 230 can dynamically increase the available bandwidth in Access Link 250 to the subscriber if the subscribed bandwidth is not sufficient to support the VoIP call. Once the VoIP call is finished and when Broadband Access Network 230 detects that the bandwidth needed by the subscriber is no longer needed, Broadband Access Network 230 will dynamically return the available bandwidth in Access Link 250 to the subscriber to the subscribed bandwidth level. In one embodiment, Broadband Access Network 230 detects the additional bandwidth is no longer needed when a disconnect signaling message is detected for a previously established network application that requires additional bandwidth over the subscribed bandwidth.

Similarly, when the subscriber establishes a video session using PC 233, PC 233 communicates with Video Server 260 using flow 241. The video session setup request traverses Broadband Modem 234, Access Link 250, Broadband Access Network 230, IP Network 210, and Video Server 260 in sequence in the order specified. When Broadband Access Network 230 detects the video session setup signaling message to establish a video session by the subscriber, Broadband Access Network 230 checks if the subscribed bandwidth subscribed by the subscriber is sufficient to support the video session. Broadband Access Network 230 uses a list of required bandwidth and associated network application types to determine if the available bandwidth to the subscriber needs to be adjusted to support the requested application.

Broadband Access Network 230 regularly updates the list of required bandwidth and associated network application types to handle new application types.

Broadband Access Network 230 can dynamically increase the available bandwidth in Access Link 250 to the subscriber if the subscribed bandwidth is not sufficient to support the SoIP service. Once the video session is finished and when Broadband Access Network 230 detects that the bandwidth needed by the subscriber is no longer needed, Broadband Access Network 230 will dynamically return the available bandwidth in Access Link 250 to the subscriber to the subscribed bandwidth level. In one embodiment, Broadband Access Network 230 detects the additional bandwidth is no longer needed when a disconnect signaling message is detected for a previously established network application that requires additional bandwidth over the subscribed bandwidth.

Figure 3:
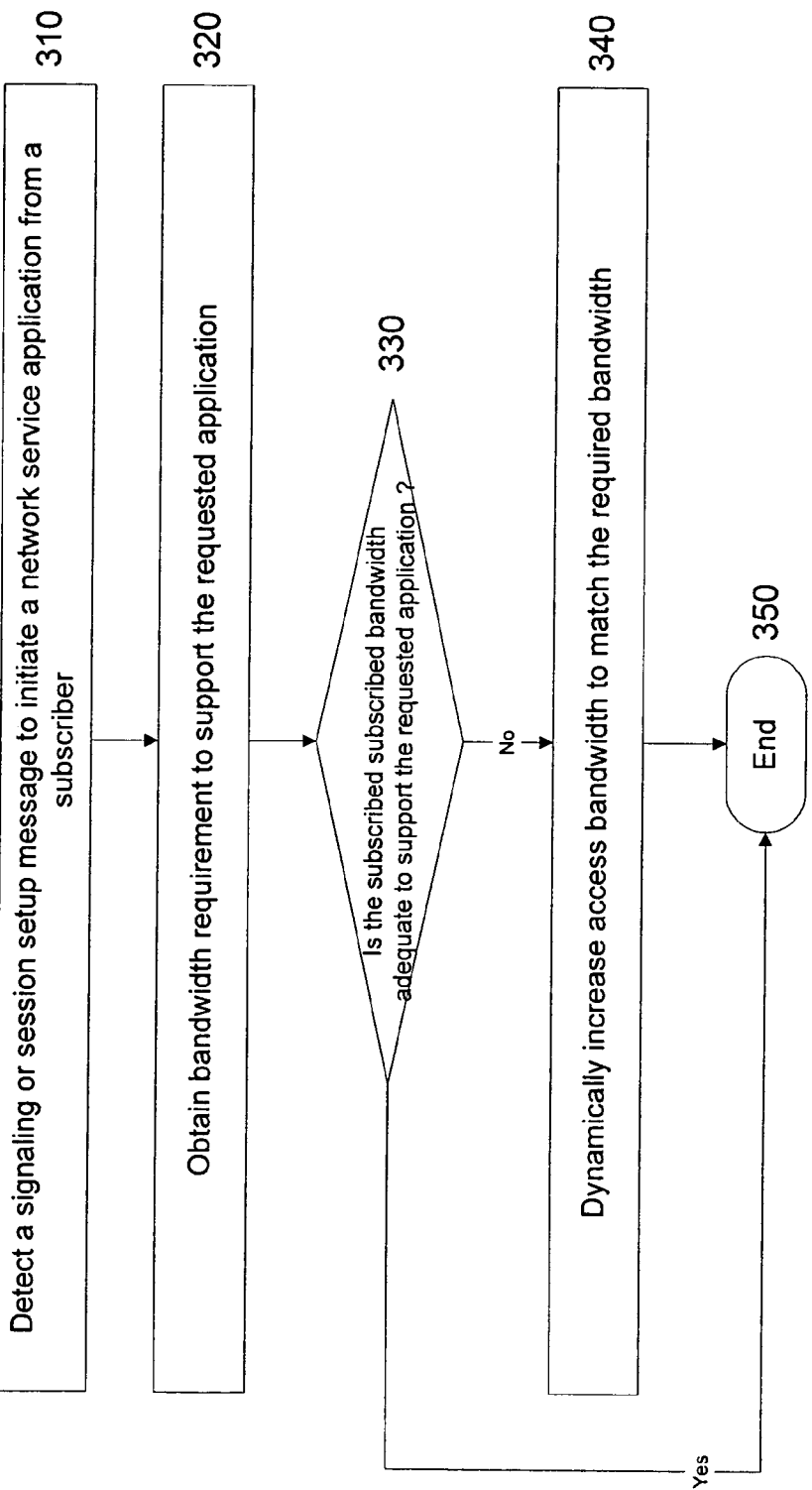
FIG. 3 illustrates a flowchart of a method for dynamically increasing broadband access bandwidth in a packet network, e.g., a VoIP network, of the present invention.

FIG. 3 illustrates a flowchart of a method 300 for dynamically increasing broadband access bandwidth in a packet network, e.g., a VoIP network, of the present invention. Method 300 starts in step 305 and proceeds to step 310.

In step 310, the method detects a signaling setup message to initiate a particular network service application originated from a subscriber. The signaling setup message to initiate a network service application is detected by a Broadband Access Network in the subscriber to network direction and the network to subscriber direction.

In step 320, the method obtains a list of required bandwidth and associated network application type to determine the bandwidth needed to support the requested network application being established via signaling. The list of required bandwidth and associated network application types is regularly updated by the Broadband Access Network to handle new application types.

In step 330, the method checks if the subscribed bandwidth subscribed by the subscriber is sufficient to support the requested network application. The Broadband Access Network uses the obtained list of required bandwidth and associated network application types stored in the network to determine if the available bandwidth to the subscriber needs to be adjusted to support the requested application. If the subscribed bandwidth level subscribed by the subscriber is sufficient to support the requested network application, the method proceeds to step 350; otherwise, the method proceeds to step 340.

In step 340, the method dynamically increases the access bandwidth available to the subscriber to match the required bandwidth of the requested network application if the requested application has been successfully established via signaling. The available bandwidth is dynamically increased by the Broadband Access Network. The method ends in step 350.

Figure 4:
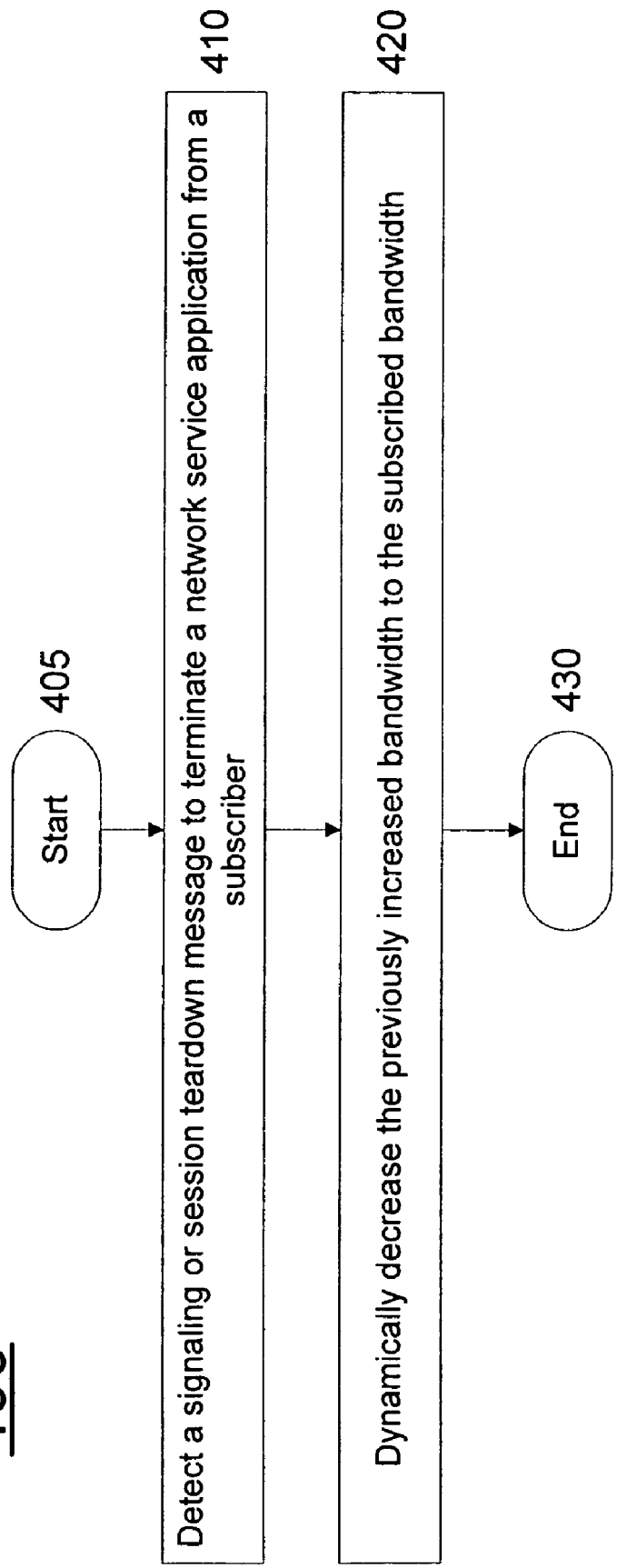
FIG. 4 illustrates a flowchart of a method for dynamically decreasing broadband access bandwidth in a packet network, e.g., a VoIP network, of the present invention.

FIG. 4 illustrates a flowchart of a method 400 for dynamically decreasing broadband access bandwidth in a packet network, e.g., a VoIP network, of the present invention. Method 400 starts in step 405 and proceeds to step 410.

In step 410, the method detects a disconnect signaling message to terminate a previously established network application that requires additional bandwidth over the subscribed bandwidth from a subscriber. The disconnect signaling message is detected by a Broadband Access Network.

In step 420, the method dynamically decreases the access bandwidth available to match the subscriber's bandwidth needs if the previously established application has been successfully disconnected via signaling. In one embodiment, the method decreases the access bandwidth available back to the subscribed bandwidth level if the previously established application has been successfully disconnected via signaling. The available bandwidth is dynamically decreased by the Broadband Access Network. The method ends in step 430.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for dynamically adjusting broadband access bandwidth, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for dynamically adjusting broadband access bandwidth can be loaded into memory 504 and executed by processor 502 to implement the functions as discussed above. As such, the present process 505 for dynamically adjusting broadband access bandwidth (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for dynamically adjusting a broadband access bandwidth in a communication network, comprising:
   detecting a disconnect signaling message to terminate a previously established network application for a subscriber; and
   adjusting dynamically an available access bandwidth to the subscriber to account for the previously established network application being terminated, wherein the adjusting comprises decreasing the available access bandwidth to a subscribed level of access bandwidth if the disconnect signaling message is detected.

2. The method of claim 1, wherein the communication network is a broadband access network.

3. The method of claim 2, wherein the disconnect signaling message is detected by the broadband access network.

4. The method of claim 3, wherein the disconnect signaling message is detected in a network to subscriber direction.

5. The method of claim 1, wherein the available access bandwidth to the subscriber is only decreased if the previously established application is disconnected successfully.

6. The method of claim 1, wherein the available access bandwidth to the subscriber is dynamically adjusted by the communication network.

7. A non-transitory computer-readable storage medium having stored thereon a plurality of instructions, the plurality of instructions including instructions which, when executed by a processor, cause the processor to perform a method for dynamically adjusting a broadband access bandwidth in a communication network, comprising:

detecting a disconnect signaling message to terminate a previously established network application for a subscriber; and adjusting dynamically an available access bandwidth to the subscriber to account for the previously established network application being terminated, wherein the adjusting comprises decreasing the available access bandwidth to a subscribed level of access bandwidth if the disconnect signaling message is detected.

8. The non-transitory computer-readable storage medium of claim 7, wherein the communication network is a broadband access network.

9. The non-transitory computer-readable storage medium of claim 8, wherein the disconnect signaling message is detected by said the broadband access network.

10. The non-transitory computer-readable storage medium of claim 9, wherein the disconnect signaling message is detected in a network to subscriber direction.

11. The non-transitory computer-readable storage medium of claim 7, wherein said the available access bandwidth to said the subscriber is only decreased if the previously established application is disconnected successfully.

12. The non-transitory computer-readable storage medium of claim 7, wherein said the available access bandwidth to said the subscriber is dynamically adjusted by the communication network.

13. An apparatus for dynamically adjusting a broadband access bandwidth in a communication network, comprising:
a processor configured to:

detect a disconnect signaling message to terminate a previously established network application for a subscriber; and adjust dynamically an available access bandwidth to the subscriber to account for the previously established network application being terminated, wherein the available access bandwidth is adjusted by being decreased to a subscribed level of access bandwidth if the disconnect signaling message is detected.

14. The apparatus of claim 13, wherein the communication network is a broadband access network.

15. The apparatus of claim 14, wherein the disconnect signaling message is detected by the broadband access network.

16. The method of claim 3, wherein the disconnect signaling message is detected in a subscriber to network direction.

17. The computer-readable storage medium of claim 9, wherein the disconnect signaling message is detected in a subscriber to network direction.

18. The apparatus of claim 13, wherein the available access bandwidth to the subscriber is only decreased if the previously established application is disconnected successfully.

19. The apparatus of claim 15, wherein the disconnect signaling message is detected in a network to subscriber direction.

20. The apparatus of claim 15, wherein the disconnect signaling message is detected in a subscriber to network direction.

* * * * *